United States Patent [19]

Yukawa et al.

[11] Patent Number: 4,872,289
[45] Date of Patent: Oct. 10, 1989

[54] CUTTER

[75] Inventors: Isao Yukawa, Odawara; Yasuji Tada, Yamato, both of Japan

[73] Assignee: Disco Abrasive Systems, Ltd., Tokyo, Japan

[21] Appl. No.: 55,978

[22] Filed: Jun. 1, 1987

[30] Foreign Application Priority Data

Jun. 10, 1986 [JP] Japan .................................. 61-132655
Jan. 14, 1987 [JP] Japan .................................... 62-5050

[51] Int. Cl.$^4$ .............................................. B24B 7/00
[52] U.S. Cl. .......................................... 51/5 R; 51/4;
51/24; 51/216 ND; 51/215 R; 51/215 AR;
51/215 UE; 51/165.76; 51/165.77

[58] Field of Search ........ 51/216 RD, 165.77, 165.76,
51/165.75, 165.74, 165.72, 215 R, 215 AR, 215
HM, 215 CP, 215 H, 215 E, 215 M, 215 SF,
215, UE, 281 SF, 288, 3, 4, 5 R, 5 A, 5 B, 24, 54,
109 R, 113, 117, 118, 121, 125, 125.5; 83/355;
408/208, 209, 207, 203.5, 34, 35, 36, 144;
409/203, 213, 217, 231

[56] References Cited

U.S. PATENT DOCUMENTS

| | | | |
|---|---|---|---|
| 3,139,637 | 7/1964 | Minkenberg | 408/36 |
| 3,858,369 | 1/1975 | Dolgov | 51/215 VE |
| 4,230,162 | 10/1980 | Miller | 408/36 |
| 4,328,726 | 11/1982 | Pearl | 83/39 |
| 4,753,047 | 6/1988 | Yoshihawa et al. | 51/215 HM |

FOREIGN PATENT DOCUMENTS

| | | |
|---|---|---|
| 0036313 | 9/1981 | European Pat. Off. . |
| 3320234 | 12/1983 | Fed. Rep. of Germany . |
| 0042748 | 3/1980 | Japan .................... 51/215 AR |
| 0118447 | 6/1985 | Japan .................... 51/215 AR |
| 0164773 | 7/1986 | Japan .................... 51/281 SF |
| 0602304 | 7/1978 | Switzerland . |
| 0686372 | 1/1953 | United Kingdom . |

Primary Examiner—Robert P. Olszewski
Assistant Examiner—Blynn Shideler
Attorney, Agent, or Firm—Beveridge, DeGrandi & Weilacher

[57] ABSTRACT

A cutter for cutting a plate-like material such as a glass sheet along concentric circular inside and outside cutting lines. The cutter includes a movably mounted supporting base stand, at least two material holding chucks disposed on the supporting base stand, and a moving device for intermittently moving the supporting base stand and sequentially positioning the chucks in a cutting zone. The cutter includes blades for cutting the material held on the chuck means along the circular inside and outside cutting lines in the cutting zone.

33 Claims, 10 Drawing Sheets

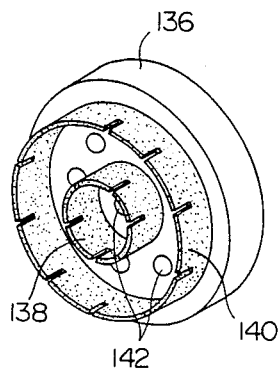
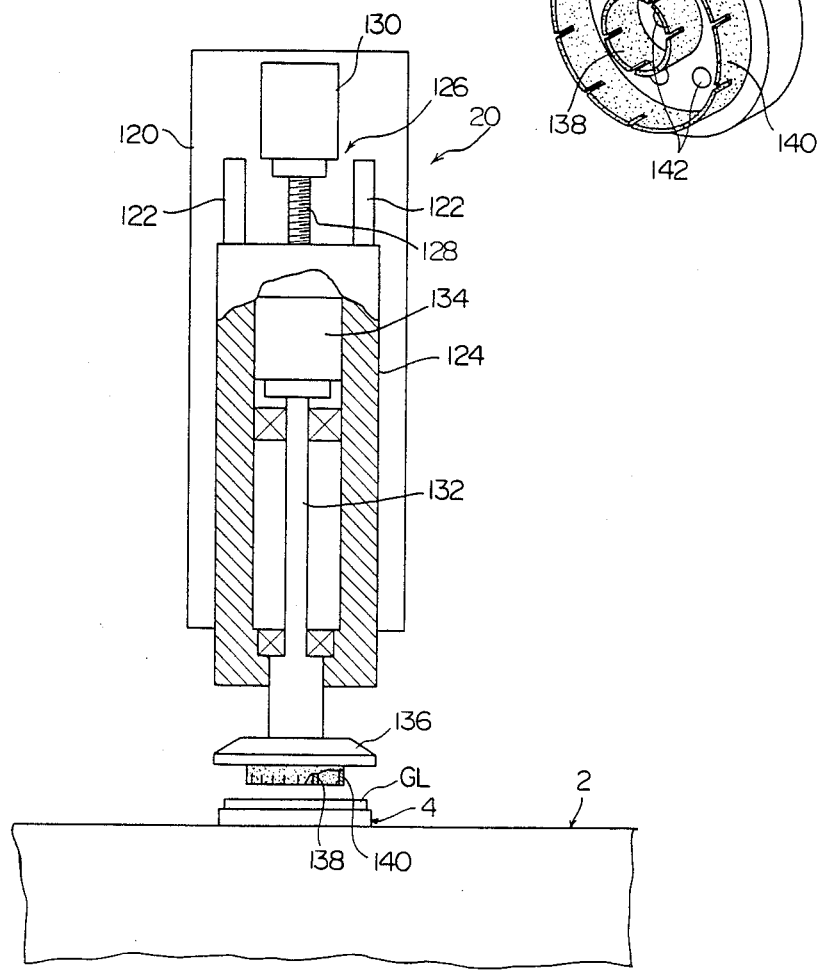
FIG. 6
FIG. 5

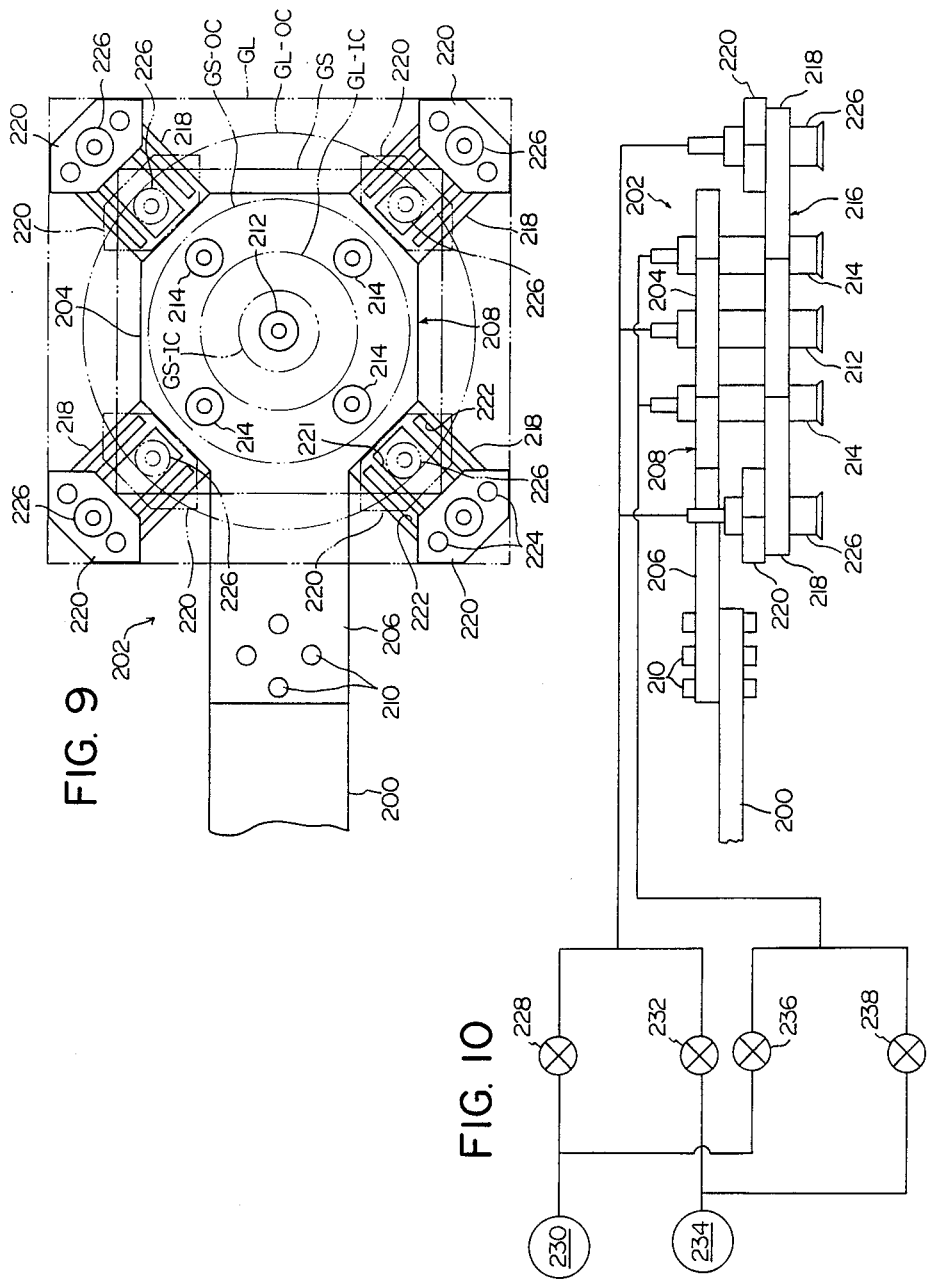

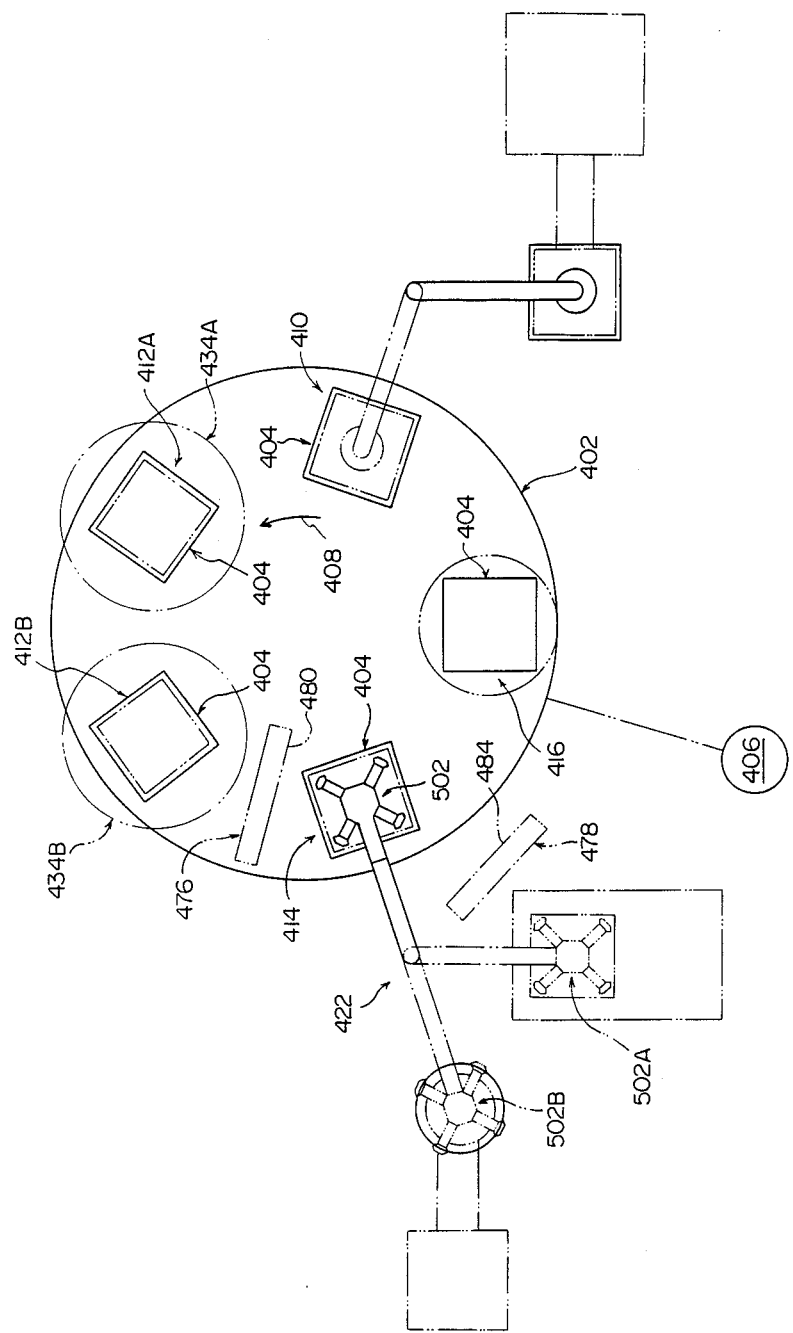

CUTTER

FIELD OF THE INVENTION

This invention relates to a cutter for cutting a plate-like material such as a glass sheet along concentric circular inside and outside cutting lines.

DESCRIPTION OF THE PRIOR ART

As is well known, optical or magnetic discs in a doughnut shape are in widespread use as optical or magnetic recording media. In the past, substrates of the optical or magnetic discs were made of a metallic material such as aluminum. In recent years, however, it was proposed to form substrates of optical or magnetic discs from glass for various reasons such as the increase of surface accuracy, and glass substrates have come into use.

In order to form such substrates from glass, it is generally necessary to cut a square or rectangular glass sheet along concentric circular inside and outside cutting lines and to obtain a doughnut-shape glass sheet remaining between the circular inside and outside cutting lines.

Since a glass sheet is highly brittle and is much more difficult to cut than a metallic plate, no cutter has yet been proposed which is suitable for cutting the glass sheet automatically along the circular inside and outside cutting lines. At present, this doughnut-shaped glass sheet is obtained by the skilled worker's manual operation of cutting a glass sheet along circular inside and outside cutting lines. Hence, the production efficiency is extremely low, and the cost of production is very high. Furthermore, doughnut-shaped glass sheets of high accuracy for use as optical or magnetic disc substrates cannot be obtained stably.

SUMMARY OF THE INVENTION

It is a primary object of this invention to provide a novel and excellent cutter by which even a highly brittle and difficultly-cuttable plate-like material such as a glass sheet can be automatically cut along concentric inside and outside cutting lines.

According to one aspect, there is provided a cutter for cutting a plate-like material along concentric circular inside and outside cutting lines, said cutter comprising a movably mounted supporting base stand, at least two material-holding chuck means disposed on the supporting base stand, intermittently moving means for intermittently moving the supporting base stand and sequentially positioning the chuck means in a cutting zone, material carry-in means for carrying a material to be cut to each of the chuck means when each chuck means is located outside the cutting zone, a cutting blade device for cutting the material held on the chuck means in the cutting zone, said blade device comprising concentric inside and outside blades mounted. rotatably and for free movement toward and away from the supporting base stand, blade rotating means for rotating the inside and outside blades, and blade moving means for moving the inside and outside blades toward and away from the supporting base stand, and material carry-out means for carrying the cut material from each of the chuck means when each chuck means is located outside the cutting zone.

In this one embodiment of the cutter of the invention, the inside and outside blades in the cutting blade device are fixedly secured to a common blade support, and are rotated as a unit and moved toward and away from the supporting base stand, In another embodiment, the inside and outside blades in the cutting blade device are rotated independently from each other, and moved toward and away from the supporting base stand.

According to another aspect of this invention, there is provided a cutter for cutting a plate-like material along concentric circular inside and outside cutting lines, said cutter comprising a movably mounted supporting base stand, at least three material-holding chuck means disposed on the supporting base stand, intermittently moving means for intermittently moving the supporting base stand, and sequentially positioning the chuck means in one of a first and a second cutting zone defined with a predetermined distance therebetween in the moving direction of the supporting base stand and then in the other of the first and second cutting zones, material carry-in means for carrying a material to be cut to each of the chuck means when each chuck means is located outside the cutting zones, a first cutting blade device for cutting the material held on the chuck means in the first cutting zone, said first cutting blade comprising a first blade mounted rotatably and for free movement toward and away from the supporting base stand, a first blade rotating means for rotating the first blade and a first blade moving means for moving the first blade toward and away from the supporting base stand, a second cuting blade device for cutting the material held on the chuck means in the second cutting zone, said second cutting blade comprising a second blade mounted rotatably and for free movement toward and away from the supporting base stand, a second blade rotating means for rotating the second blade means and a second blade moving means for moving the second blade toward and away from the supporting base stand, and material carry-out means for carrying the cut material from each of the chuck means when each chuck means is located outside the cutting zone;

one of the first and second cutting blade devices being adapted to cut the material along the inside cutting line and the other of the first and second cutting blade devices being adapted to cut the material along the outside cutting line.

Other objects of this invention will become apparentent from the following description taken in conjunction with the accompanying drawings.

BRIEF DESCRIPTION OF THE DRAWINGS

FIG. 5 is a front view, partly in section, of a cutting blade device in the cutter of FIG. 1;

FIG. 6 is a perspective view showing an inside and an outside blade in the cutting blade device of FIG. 5;

FIG. 9 is a top plan view showing a suction-adhering head in material carry-out means in the cutter of FIG. 1;

FIG. 10 is a side view of the suction-adhering head of FIG. 9;

FIG. 13 is a simplified top plan view showing a second embodiment of the cutter constructed in accordance with this invention;

DETAILED DESCRIPTION OF PREFERRED EMBODIMENTS

Embodiments of the cutter constructed in accordance with this invention will be described below in detail.

Figure 1:
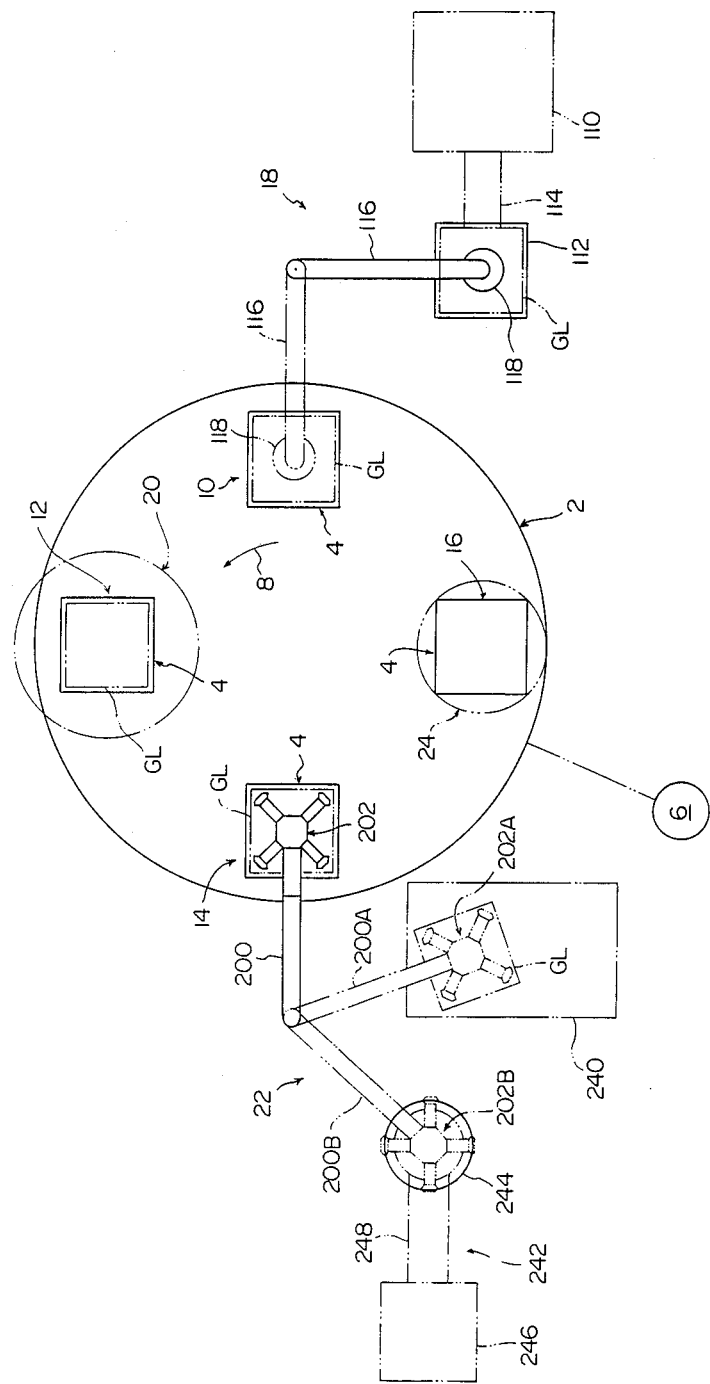
FIG. 1 is a simplified top plan view showing a first embodiment of the cutter constructed in accordance with the invention.

With reference to FIG. 1, the illustrated cutter comprises a supporting base stand 2 composed of a disc mounted rotatably around a substantially vertically extending central axis (extending substantially perpendicularly to the sheet surface in FIG. 1). Four material-holding chuck means 4 spaced from each other by an angle of 90 degrees are disposed on the supporting base stand 2. The supporting base stand 2 is drivingly connected to intermittently moving means 6, which may be an electric motor, via a suitable transmission mechanism (not shown). The intermittently moving means 6 moves the supporting base stand intermittently through 90 degrees every time. On the supporting base stand 2 are defined a material carry-in zone 10, a cutting zone 12, a material carry-out zone 14 and a chuck washing zone 16 spaced from each other by an angular distance of 90 degrees in this sequence as viewed in the rotating direction shown by an arrow 8 of the supporting base stand 2. It will be readily appreciated from FIG. 1 that when the supporting base stand is intermittently rotated through 90 degrees by the moving means 6, each of the chuck means 4 is sequentially positioned in the material carry-in zone 10, the cutting zone 12, the material carry-out zone 14 and the chuck cleaning zone 16.

In relation to material carry-in zone 10, material carry-in means shown generally at 18 is provided. A cutting blade device shown generally at 20 is provided in relation to the cutting zone 12; material carry-out means shown generally at 22, in relation to the material carry-out zone 14; and a washing device shown generally at 24, in relation to the chunk washing zone 16.

Figure 2:
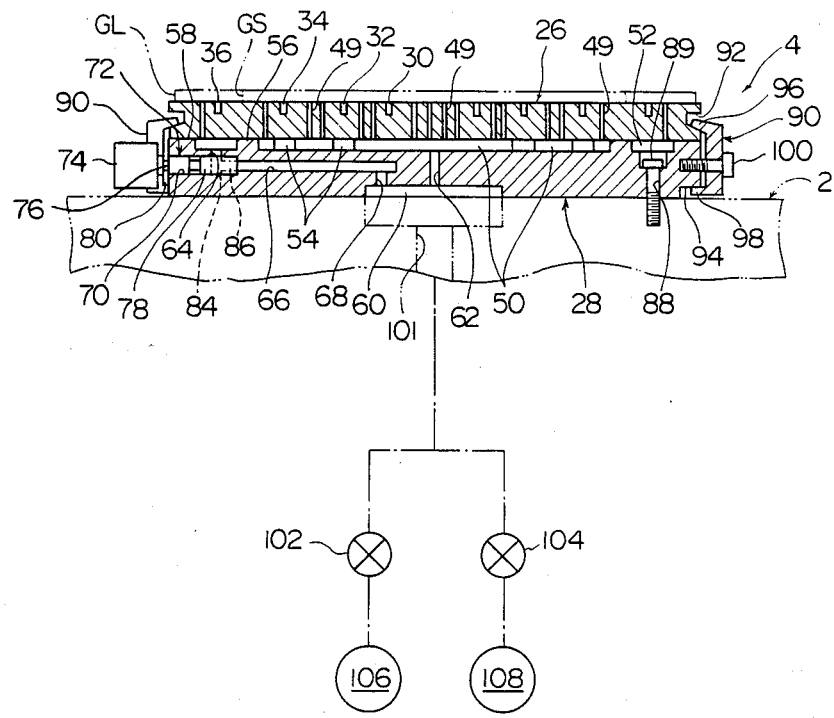
FIG. 2 is a sectional view showing chuck means in the cutter of FIG. 1.
Figure 3:
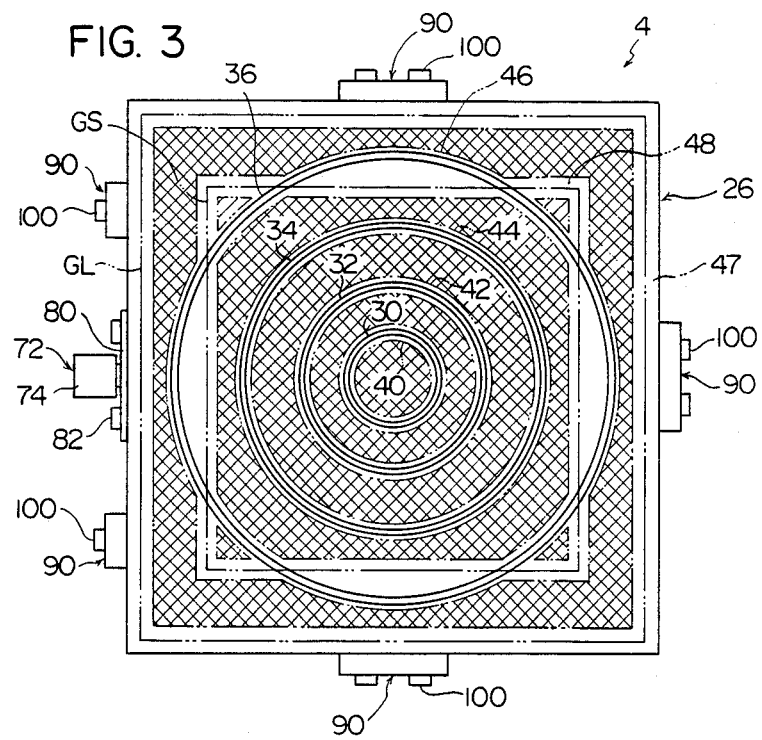
FIG. 3 is a top plan view of the chuck means in FIG. 2.
Figure 4:
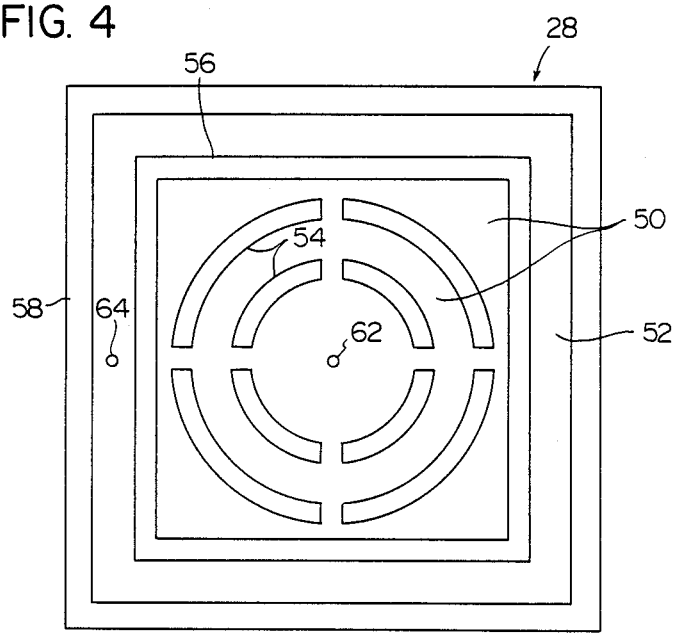
FIG. 4 is a top plan view of a holding plate in the chuck means of FIG. 2.

With reference to FIGS. 2 to 4, the chuck means 4 will be described. Each of the chuck means 4 in the illustrated embodiment is provided with a chuck plate 26 and a holding plate 28. The chuck plate 26 and the holding plate 28 may be of a suitable shape such as a circle or rectangle. If the material to be cut is square, they are conveniently nearly square. As clearly shown in FIGS. 2 and 3, four annular grooves 30, 32, 34 and 36 are concentrically formed on the upper surface of the chuck plate 26. The chuck plate 26 is gas-impervious at its outside edge area, four nearly annular areas 40, 42, 44 and 46 where the annular grooves 30, 32, 34 and 36 are formed, a peripheral edge area 47, and an area 48 extending inwardly of, and parallel to, the peripheral edge area 47, but its other parts shown by cross hatchings in FIG. 3 are gas-pervious. Such gas-perviousness may be obtained by forming a number of vertically extending holes 49 (FIG. 2) in the chuck plate 26 at those parts which are shown by cross hatchings in FIG. 3. Alternatively, the cross-hatched parts alone of the chuck plate 26 may be made of a porous material.

With reference to FIGS. 2 and 4, an inside depressed portion 50 and an outside depressed portion 52 are formed on the upper surface of the holding plate 28. The inside depressed portion 50 is nearly square, and eight arcuate supporting lands 54 remain in it. The outside depressed portion 52 extends continuously along the peripheral edge of the inside depressed portion 50, and a continuously extending isolated land 56 exists between the inside and outside depressed portions 50 and 52. A continuously extending outer circumferential land 58 exists outwardly of the outside depressed portion 52. It is seen from FIG. 2 that the upper surfaces of the supporting lands 54, the isolated land 56 and the outer circumferential land 58 are on the same plane. The outer circumferential land 58 is positioned correspondingly to the peripheral area 47 of the chuck plate 26, and the isolated land 56 corresponds in position to the area 48 of the chuck plate 26. A depressed portion 60, which may be circular, is formed inthe central part of the under surface of the holding plate 28. The holding plate 28 further has formed therein a first communication line for communication between the inside depressed portion 50 and to depressed portion 60 and a second communication line for communication between the outside depressed portion 52 and the depressed portion 60. The first communication line is formed of a hole 62 from its upper end opened in the inside depressed portion 50 to its lower end opened in the depressed portion 60. The second communication line includes a hole 64 extending downwardly from its upper end opened in the outside depressed portion 52, a substantially horizontally extending hole 66, and a hole 68 extending from the inside end portion of the hole 66 downwardly to its lower end opened in the depressed portion 60. A large-diameter hole 70 extending inwardly from one side surface (the left side surface in FIGS. 2 and 4) of the holding plate 28 is also formed in the holding plate 28. The lower end of the hole 64 is connected to the large-diameter hole 70, and the outside end of the hole 66 is also connected to the large-diameter hole 70. An opening-closing control member 72 is rotatably set up in the large-diameter hole 70. The opening-closing control member 72 has a head portion 74, a small-diameter portion 76 and a valve portion 78 having an outside diameter corresponding to the inside diameter of the large-diameter hole 70. The opening-closing control member 72 is rotatably set up in position by fixing a retaining plate 80 having an elongate slot for receiving the small-diameter portion 76 to the aforesaid one side surface of the holding plate 28 by means of a fastening screw 82 (FIG. 3). A diametrically extending hole 84 and a hole 86 extending from the hole 84 to the valve portion 78 are formed in the valve portion 78 of the control member 72. When the control member 72 is located at the angular position shown in FIG. 2, the holes 64 and 66 are kept in communication with each other by the holes 84 and 86, and therefore the outside depressed portion 52 communicates with the depressed portion 60. When the control member 72 is rotated through, for example, about 90 degrees, by grasping the head portion 74, the holes 84 and 64 are kept out of communication, and therefore, the outside depressed portion does not communicate with the depressed portion 60.

As shown in FIGS. 2 and 4, through-holes 88 spaced from each other a suitable distance are formed in the outside depressed portion 52 in the holding plate 28. The holding plate 28 is fixed in position of the supporting base stand 2 by threadedly securing a fastening bolt 89 to the supporting base stand 2 through through-holes 88. The chuck plate 26 is mounted on the holding plate 28 with a plurality of linking members 90. As shown in FIG. 2, a groove 92 is formed in the chuck plate 26 and a shoulder portion 94 is formed in the side surface of the holding plate 28. The linking members 90 are fixed to the side surface of the holding plate 28 by fastening bolts 100 after an upper engaging leg in each linking member 90 is received in the groove 92 and a lower engaging leg 98 in each linking member 90 is secured to the shoulder portion 94.

In the chuck means 4 described above, the depressed portion 60 formed in the under surface of the holding plate 28 is caused to communicate selectively with a vacuum source 106 and a water supply source 108 by the control of control valves 102 and 104 via a suitable communication passage including a communication passage 101 formed in the supporting base stand 2. More specifically, when a plate-like material to be cut (such as a glass sheet) is placed on the chuck plate 26 in the material carry-in zone 10 (FIG. 1), the depressed portion 60 communicates with the vacuum source 106. If the material to be cut is a relatively large square plate and its outside edge is positioned on the outer circumferential area 47 as shown by a two-dot chain line GL in FIGS. 2 and 3, the opening-closing control member 72 is held at an open position shown in FIG. 2. Consequently, the depressed portion 60 communicates with the inside depressed portion 50 via the hole 62 and the depressed portion 60 communicates with the outside depressed portion 52 via the holes 68, 66, 86, 84 and 64. Thus, air is sucked through all gas-pervious parts of the chuck plate 26 and the material GL is suction-adhered to the chuck plate 36. On the other hand, if the material to be placed on the chuck plate 26 is a relatively small square material and its outside edge is positioned on the area 48 as shown by a two-dot chain line GS in FIGS. 2 and 3, the opening-closing control member 72 is rotated through about 90 degree from the open position shown in FIG. 2 and brought to a closed position. Consequently, the depressed portion 60 communicates with the inside depressed portion 50 via the hole 62 but is out of communication with the outside depressed portion 52. Thus, air is sucked through the gas-pervious parts of the chuck plate 26 only in an area inwardly of the isolated land 56, and the material GS is placed on the chuck plate 26. Since the outside depressed portion 52 is out of communication with the depressed portion 60, air is not sucked through the gas-pervious parts of the chuck plate 26 in an area which is outwardly of the isolated land 56 and is not covered with the material GS. Hence, suction-adhering of the material GS is not adversely affected.

When the chuck means 4 is positioned in the material carry-out zone 14, the depressed portion 60 is cut off from the vaccum source 106 and is kept is commuication with the water supply source 108. Thus, water flows over the upper surface of the chuck plate 26 through the gas-pervious parts of the chuck plate 26 and makes the material GL or GS on the chuck plate 26 afloat.

Again, with reference to FIG. 1, the material carry-in means 18 disposed in relation to the material carry-in zone 10 includes a cassette placing stand 110 on which to place a cassette capable of holding a plurality of plate-like materials (GL or GS) spaced in a vertical direction, a plate-like material receiving stand 112, and a feed mechanism 114 for feeding the plate-like materials GC (or GS) one by one to the receiving stand 112 from the cassette placed on the cassette placing stand 110. The cassette-placing stand 110, the cassette to be placed on it, and the feed mechanism 114 may be of substantially the same structure as known ones generally used, for example, in a machine for grinding the back surface of a semiconductor wafer, and a description of their structures and operations will be omitted here. The material carry-in means 18 further includes a pivot arm 116 which is mounted so that it is free to pivot reciprocatingly between a suction-adhering position shown by a solid line and a separating position shown by a two-dot chain line around a pivot axis extending substantially vertically (extending substantially perpendicularly to the sheet surface in FIG. 1), and is also free to ascend and descend in a substantially vertical direction. A suction-adhering head 118 of a suitable type is provided at the free end of the pivot arm 116. The a suction-adhering head 118 is connected to a vacuum source which may be an ordinary vacuum pump or ejector and an air supply source via a communication line including a switch valve (not shown), and is selectively brought into communication with the vacuum source or the supply source. When the pivot arm 116 is held at the suction-adhering position shown by the solid line, the suction adhering head 118 is positioned immediately above the plate-like material GL (or GS) on the receiving stand 112. In this state, the suction-adhering head 118 is allowed to communicate with the vacuum source, and thus suction-adheres the plate-like material GL (or GS) placed on the receiving stand 112. Then, the pivot arm 116 is elevated a predetermined distance, and pivoted to the separating position shown by the two-dot chain. Thereafter, it is lowered a predetermined distance. As a result, the suction-adhering head 118 is disconnected from the vacuum source and allowed to communicate with the air supply source for some period of time. Hence, the plate-like material GL (or GS) is separated from the suction-adhering head 118 and placed on the chuck means 4. Thus, the plate like material GL (or GS) is carried onto the chuck means 4 in the material carry-in zone 10. Thereafter, the pivot arm 116 is elevated a predetermined distance, then pivoted to the suction-adhering position shown by the solid line and lowered a predetermined distance in order to carry the next plate-like material GL (or GS).

The cutting blade device 20 disposed in relation to the cutting zone 12 will be described. With reference to FIG. 5, the cutting blade device 20 includes a stationary supporting frame 120 disposed above the supporting base stand 2. A pair of guide rails 122 extending substantially vertically in spaced-apart relationship are fixed to the front surface of the supporting frame 120, and a movable supporting member 124 are mounted on the pair of guide rails 122 for free ascending and descending movement in a substantially vertical direction. Blade moving means 126 for elevating or lowering the movable supporting member 124 is also provided in the front surface of the supporting frame 120. The blade moving means 126 has a rotatably mounted and substantially vertically extending externally threaded rod 128 and an electric motor 130 for rotating the externally threaded rod 128. The externally threaded rod 128 is fitted in an internally threaded hole (not shown) formed in the movable supporting member 124. Hence, as the externally threaded rod 128 rotates in a normal and a reverse direction, the movable supporting member 124 is lowered or elevated. A substantially vertically extending shaft 132 is rotatably mounted on the movable supporting member 124, and blade rotating means 134, which may be an electric motor, for rotating the shaft 132 is also mounted. The shaft 132 projects downwardly beyond the movable supporting member 124, and a blade supporting member 136 is fixed to its end. With reference to FIGS. 5 and 6, two concentric blades, i.e. a relatively small-diameter cylindrical inside blade 138 and a relatively large-diameter cylindrical outside blade 140 are fixedly secured to the under surface of the blade supporting member 136. A plurality of cooling liquid jetting holes 142 are formed in the blade supporting member 136 in order to jet out a cooling liquid such as water at the time of cutting with the inside blade 138 and the outside blade 140. The preferred structures of the inside blade 138 and the outside blade 140 which can be formed by bonding diamond abrasive grains with metal or the like and a method for their production are described in detail in the specifications and drawings of U.S. patent application Ser. No. 942,522 filed on Oct. 29, 1986 and European patent application No. 86115354.2 filed on Nov. 5, 1986 (corresponding to Japanese patent application No. 247749/1985 filed on Nov. 5, 1986). The disclosures of these specification are cited herein as a reference in lieu of describing them in detail in the present specification. In the illustrated embodiment, the inside blade 138 and the outside blade 140 are of a circumferentially continuous cylindrical shape. If desired, each of the blades 138 and 140 may be constructed of a plurality of arcuate pieces disposed in circumferentially spaced-apart relationship.

Figure 7:
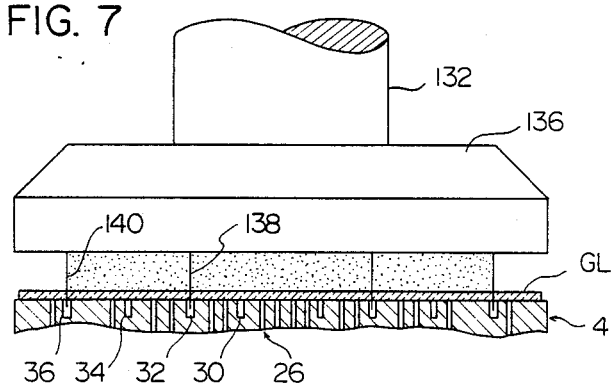
FIG. 7 is a partial sectional view showing the state of cutting of a plate-like material by the cutting blade device of FIG. 5.

With reference to FIGS. 5 and 7, the shaft 132 is rotated at a relatively high speed in the cutting zone 12 by energizing the blade rotating means 134. As a result, the inside blade 138 and the outside blade 140 are rotated at a relatively high speed. In addition, the blade moving means 126 is energized to lower the movable supporting member 124 at a relatively low speed, and thus, the inside blade 138 and the outside blade 140 are lowered at relatively low speeds. As a result, the inside blade 138 and the outside blade 140 rotating at relatively high speeds act gradually downwardly on the upper surface of the plate-like material GL and cut it as shown in FIG. 7. The plate-like material GL is cut by the inside blade 138 along a circular inside cutting line, and by the outside blade 140 along a circular outside cutting line. During the cutting operation, a cooling liquid such as water is jetted out from the cooling liquid jet holes 142 (FIG. 6). As shown in FIG. 7, the inside blade 138 and the outside blade 140 are lowered until they completely cut the plate-like material GL. The lower ends of the inside blade 138 and the outside blade 140 which project downwardly beyond the under surface of the plate-like material GL advance into the annular grooves 32 and 36 formed on the surface of the chuck plate 26 of the chuck means 4. On the other hand, if the plate-like material to be cut is a relatively small square material, inside and outside blades having a relatively small diameter are used. In this case, the lower ends of the inside and outside blades advance into the other annular grooves 30 and 34 formed on the surface of the chuck plate 26. When the cutting of the plate-like material GL (or GS) is over, the inside blade 138 and the outside blade 140 are elevated away from the plate-like material GL (or GS).

If desired, the lowermost descending positions of the inside blade 138 and the outside blade 140, and therefore, the cutting depth of the plate-like material GL may be set so that some uncut part (for exemple, several micrometers in size) remains in the undersurface of the plate-like material GL. In this case, the uncut part is broken by applying some force to it. When a suitable plastic tape is adhered to the back surface of the plate-like material GL, the plate-like material GL may be maintained unitary by cutting the tape only in completely. However, the plate-like material GL may be cut completely without leaving an uncut part at its bottom portion.

Figure 8:
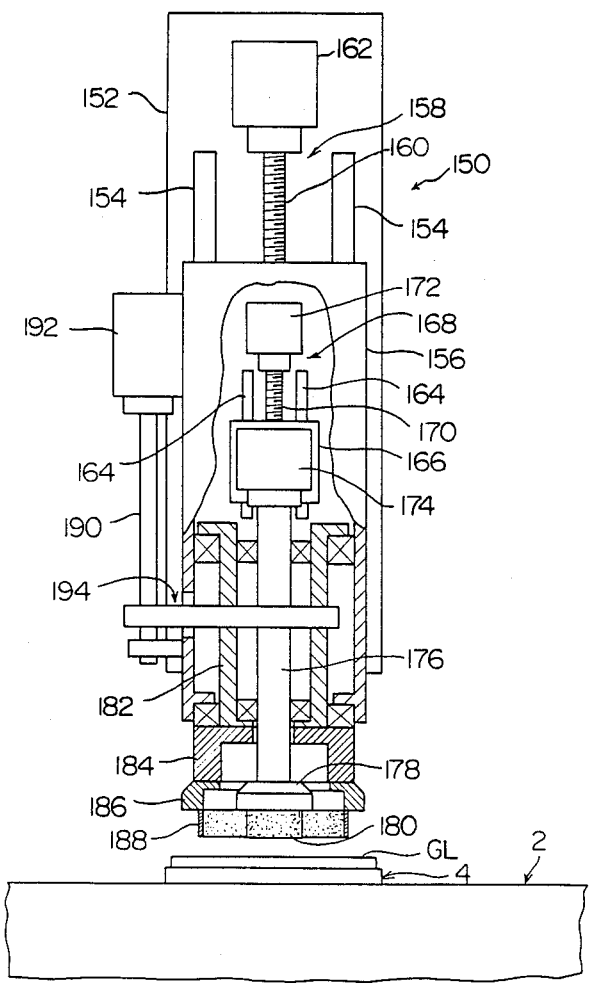
FIG. 8 is a front view, partly in section, of a modified example of the cutting blade device.

FIG. 8 shows a modified example of the cutting blade device. The cutting blade device shown generally at 150 includes a stationary supporting frame 152 disposed above the supporting base stand 2. A pair of spaced and substantially vertically extending guide rails 154 are fixed to the front surface of the supporting frame 152, and a movable supporting member 156 is mounted on the pair of guide rails 154 so as to be free to ascend and descend in a substantially vertical direction. Blade moving means 158 for elevating or lowering the movable supporting member 156 is provided in the front surface of the supporting frame 152. The blade moving means 158 has an externally threaded rod 160 rotatably mounted and extending substantially vertically and an electric motor 162 for rotating the externally threaded rod 160. The externally threaded rod 160 is fitted in an internally threaded hole (not shown) formed in the movable supporting member 156. Hence, rotation of the externally threaded rod 160 in a normal and a reverse direction lowers and elevates the movable supporting member 156. A pair of spaced and substantially vertically extending guide rails 164 are fixed to the inside of the movable supporting member 156. An auxiliary supporting member 166 is mounted on the pair of guide rails 164 so as to be free to ascent or descend in a substantially vertical direction. Auxiliary moving means 168 for elevating or lowering the auxiliary supporting member is provided in the movable supporting member 156. The auxiliary moving means 168 has an externally threaded rod 170 mounted rotatably and extending substantially vertically and an electric motor 172 for rotating the externally threaded rod 170. The externally threaded rod 170 is fitted in an internally threaded hole (not shown) formed in the auxiliary supporting member 166. Hence, rotation of the externally threaded rod 170 in a normal and a reverse direction lowers and elevates the auxiliary supporting member 166. Mounted on the auxiliary supporting member 166 are a first rotating means 174 which may be an electric motor and a shaft 176 extending downwardly in a substantially vertical direction from its upper end drivingly connected to the output shaft of the first rotating means 174. The shaft 176 projects downwardly beyond the movable supporting member 156, and a nearly disc-like inside blade supporting member 178 is fixed to its lower end. An inside blade 180 which may be substantially the same as the inside blade 138 (FIGS. 5 and 6) in the aforesaid cutting blade device 20 is fixedly secured to the under surface of the inside blade supporting member 178. A nearly cylindrical rotating member 182 is rotatably set up in the lower part of the inside of the movable supporting member 156. The rotating member 182 projects slightly downwardly beyond the lower end of the movable supporting member 156, and an annulalr linking member 184 is fixed to the projecting lower end of the rotating member 182. An annular outside blade supporting member 186 is fixed to the lower end of the linking member 184. An outside blade 188 which may be substantially the same as the outside blade 140 (FIGS. 5 and 6) in the aforesaid cutting blade device 20 is fixed to the under surface of the outside blade supporting member 186. A rotating shaft 190 is rotatably mounted on the outside surface of the movable supporting member 156, and a second rotating means 192 which may be an electric motor is mounted on the shaft 190 and drivingly connected thereto. The shaft 190 is drivingly connected to the rotating member 182 by a belt mechanism 194. Hence, when the second rotating means 192 is energized and the shaft 190 is rotated, the rotating member 182 is rotated to cause rotation of the outside blade 188.

The operation of the cutting blade device 150 will be described briefly. As required, prior to actual starting of the cutting operation, the auxiliary moving means 168 is energized to lower or elevate the auxiliary supporting member 166 and the vertical position of the inside blade 180 with respect to the outside blade 188 is adjusted. The adjusted vertical position of the inside blade 180 may be such that the lower end of the inside blade 180 matches with the lower end of the outside blade 188 (and therefore, the cutting depth of the plate-like material GL (or GS) by the outside blade 188 is made substantially equal to that by the inside blade 180. The amount of wear of the inside blade 180 by the cutting of the plate-like material GL (or GS) is not necessarily the same as that of the outside blade 188. If, therefore, the vertical position of the inside blade 180 cannot be adjusted as desired, the cutting depths of the plate-like material by the blades cannot be adjusted to the required values as the cutting operation is repeated. Specifically, if one of the cutting depth of the plate-like material GL (or GS) by the inside blade 180 and its cutting depth by the outside blade 188 is adjusted to a required value, the other deviates from the required value. In the cutting blade device 150 shown in FIG. 8, however, both the cutting depth of the plate-like material GL (or GS) by the inside blade 180 and that by the outside blade 188 can be adjusted to a required value by properly adjusting the vertical position of the inside blade 180 according to the amounts of wear of the inside blade 180 and the outside blade 188.

To perform the cutting operation, the first rotating means 174 is energized to rotate the inside blade 180 at a relatively high speed and the second rotating means 192 is energized to rotate the outside blade 188 at a relatively high speed. The rotating direction of the inside blade 180 and that of the outside blade 188 may be the same, but conveniently opposite to each other. The blade moving means 158 is also energized to lower the movable supporting member 156 at a relatively low speed. As a result, the inside blade 180 and then outside blade 188 are lowered at relatively low speeds. As in the case of the cutting blade device 20 described hereinabove the inside blade 180 cuts the plate-like material GL (or GS) along a circular inside cutting line, and the outside blade 188 cuts the plate-like material GL (or GS) along a circular outside cutting line. A cooling liquid such as water may be jetted out from a cooling liquid jetting hole (not shown) formed, for example, in the inside blade supporting member 178 and/or the outside blade supporting member 186 during the cutting. In the modified embodiment shown in FIG. 8, the inside blade 180 and the outside blade 188 are lowered as a unit during the cutting operation. If desired, the inside blade 180 and the outside blade 188 may be independently lowered during the cutting operation.

Again, with reference to FIG. 1, the material carry-out means 22 provided in relation to the material carry-out zone 14 will be described. The illustrated material carry-out means 22 includes a pivot arm 200. One end portion of the pivot arm 200 is mounted such that it is free to pivot around a pivot axis extending substantially vertically (extending substantially perpendicularly to the sheet surface in FIG. 1) and to ascend or descend in a substantially vertical direction. The pivot arm 200 is elevated or lowered as will be described hereinafter by a suitable elevating or lowering means (not shown), and pivoted by a suitable pivoting means (not shown) to be selectively held at a suction-adhering position shown by a solid line, a discarding position shown by a two-dot chain line 200A, and an accommodating position shown by a two-dot chain line 200B. A suction-adhering head 202 is attached to the free end portion of the pivot arm 200.

With reference to FIG. 1, 9 and 10, the suction-adhering head 202 comprises a first supporting plate 208 having an octagonal main portion 204 and a linking portion 206 extending from one side edge of the main portion 204. The projecting end portion of the linking leg portion 206 of the first supporting plate 208 is fixed to the free end portion of the pivot arm 200 by means of a suitable fastener such as a bolt and a nut. On the main portion 204 of the first supporting plate 208 are mounted one first suction-adhering member disposed centrally thereof and four second suction-adhering members 214 disposed outwardly of the first suction-adhering member 212. The second suction-adhering members are spaced from each other by an angle of 90 degrees, and the distances from the first suction-adhering member 212 and the second suction-adhering members 214 are set at a substantially equal value. The first suction-adhering member 212 and the second suction adhering-members 214 may be of a known type. They extend downwardly from the first supporting plate 208 and their under surfaces function as suction-adhering surfaces. The suction-adhering head 202 further includes a second supporting plate 216 connected to the first supporting plate 208 via the first suction-adherig member 212 and the second suction-adhering members 214 and positioned below the first supporting plate 208. The second supporting plate 216 has four supporting leg portions 218 spaced from each other by an angle of 90 degrees and extending radially outwardly. A mounting plate 220 is attached to each of the supporting leg portion 218 so that its position can be adjusted in the radial direction. Specifically, each of the supporting leg portions 218 has formed therein an opening 221 extending in its central portion in the extending direction of the leg portion 218 and a pair of elongate slits 222 extending along both side portions of the leg portion 218 in the extending direction of the leg portion 218. The mounting plate 220 is attached to each of the supporting leg portions 218 by a pair of fasteners 224 which may be a bolt extending through the slit 222 and a nut co-acting with it. Accordingly, the attached position of the mounting plate 220 can be properly adjusted along the slits 222. To the mounting plate 220 is also attached a third suction-adhering member 226. The third suction-adhering member 226 may be of a known type as is the case with the first as suction-adhering member 212 and the second suction-adhering members 214, and extends downwardly through the opening 221. The under surface of the third suction-adhering member 226 functions as a suction-adhering surface. It is seen from FIG. 10 that the under surfaces (i.e., the suction-adhering surfaces) of the suction-adhering members 212, 214 and 226 are positioned within substantially the same plane. The first suction-adhering member 212 and the third suction-adhering members 226 are connected to a vacuum source 230 via a control valve 228 and also to an air supply source 234 via a control valve 232. The second suction-adhering members 214 are connected to the vacuum source 230 via another control valve 236, and to the air supply source 234 via another control valve 238. The vacuum source 230 may be constructed of a vacuum pump, or an ejector having an orifice through which air from the air supply source 24 is permitted to flow.

With reference to FIG. 1, when the pivot arm 200 is held at the suction-adhering position shown by the solid line, the suction-adhering head 202 is positioned opposite to, and above, one chuck means 4 in the material carry-out zone 14. When the pivot arm 200 is held at the discarding position shown by two-dot chain line 200A, the suction-adhering head 202 is positioned opposite to, and above, a discarding receptacle 240 which may be a box having an open top. When the pivot arm 200 is held at the accommodating position shown by two-dot chanin line 200B, the suction-adhering head 202 is positioned opposite to, and above, accommodating means 242. The accommoodating means 243 may be of a known type and comprises a receiving stand 244 for receiving the product (doughnut-shaped product) from the suction-adhering head 202, a cassette-placing stand 246 on which to place a cassettes capable of accommodating a plurality of products, and a carry-in mechanism 248 for carrying the products from the receiving stand 244 into the cassette on the cassette placing stand 246.

The operation and advantage of the material carry-out means 22 will be described. To carry the cut plate like material GL (or GS) from the chuck means 4 located in the material carry-out zone 14, first the pivot arm 200 and the suction-adhering head 202 attached to its free end portion are held at the suction-adhering position shown by the solid line. Then, the pivot arm 200 and the suction-adhering head 202 are lowered to a position at which the under surfaces of the first, second and third suction-adhering members 212, 214 and 226 are in contact with, or in proximity to, the surface of the plate-like material GL (or GS) on the chuck means. The control valves 228 and 236 are then opened to allow the first, second and third suction-adhering members 212, 214 and 226 to communicate with the vacuum source 230. As a result, the plate-like material GL (or GS) afloat over the chuck means 4 is suction-adhering to the first, second and third suction-adhering members 212, 214 and 226.

If the plate-like material is a relatively large square material (GL), each mounting plate 220 in the suction-adhering head 202 is held at an outside position shown by a solid line in FIG. 8. It will be seen by reference to FIG. 9 that at this time, the first suction-adhering member 212 suction-adheres the central portion of the plate-like material GL, i.e., a central unwanted portion inwardly of the inside cutting line GL-IC; the second suction-adhering members 214 suction-adhere a production portion between the inside cutting line GL-IC and the outside cutting line GL-OC; and the third suction-adhering members 226 suction-adhere an outside unwanted portion of the plate-like material GL outwardly of the outside cutting line GL-OC. On the other hand, if the plate-like material is a relatively small square material (GS), each mounting plate 220 in the suction-adhering head 202 is held at an inside position shown by a two-dot chain line in FIG. 9. It will be seen by reference to FIG. 9 that in this case, the first suction-adhering member 212 suction-adheres a central unwanted portion of the plate-like material GS inwardly of the inside cutting line GS-IC; the second suction-adhering members 214 suction-adhere a product portion of the plate-like material GS between the inside cutting line GS-IC and the outside cutting line GS-OC; and the third suction-adhering members 226 suction-adhere an outside unwanted portion of the plate-like material GS outwardly of the outside cutting line GS-OC.

When the first, second and third suction-adhering members 212, 214 and 226 thus suction-adhere the plate-like material GL (or GS), the pivot arm 200 and the suction-adhering head 202 are elevated a predetermined distance, and the entire plate-like material GL (or GS) is lifted from the chuck means 4. Then, the pivot arm 200 and the suction-adhering head 202 are pivoted to the discarding positions shown by two-dot chain lines 200A and 202A shown in FIG. 1. Thereafter, the control valve 228 is closed to disconnect the first and third suction-adhering members 212 and 226 from the vacuum source 230. Simultaneously with, or immediately after, this disconnection, the control valve 232 is opened for only a short period of time to connect the first and third suction-adhering members 212 and 226 to the air supply source 234 for only a short period of time. As a result, air is jetted out from the under surfaces of the first and third suction-adhering members 212 and 226 to detach the central unwanted portion of the plate-like material GL (or GS inwardly of the inside cutting line GL-IC (or GS-IC), and the outside unwanted portion outwardly of the outside cutting line GL-OC (or GS-IC) from the first and third suction-adhering members 212 and 226 and allow them to fall into the discarding receptacle 240. In the meantime, the product portion of the plate-like material GL (or GS) existing between the inside cutting line GL-IC (or GS-IC) and the outside cutting line GL-OC (or GS-OC) are kept suction-adhered to the second suction-adhering members 214 maintained in communication with the vacuum source 230.

Then, the pivot arm 200 and the suction-adhering head 202 are pivoted to the accommodating positions shown by two-dot chain lines 200B and 202B in FIG. 1. The control valve 236 is then closed to disconnect the second suction-adhering members 214 from the vacuum source 230, and simultaneously with, or immediately after, this operation, the control valve 238 is opened for only a short period of time to keep the second suction-adhering members 214 in communication with the air supply source 234 for only a short period of time. As a result, air is jetted out from the under surfaces of the second suction-adhering members 214 to detach the product portion of the plate-like material GL (or GS) existing between the inside cutting line GL-IC (or GS-IC) and the outside cutting line GL-OC (or GS-OC) from the second suction-adhering members 214 and place it on the receiving stand 244 of the accommodating means 242 located below.

Figure 11:
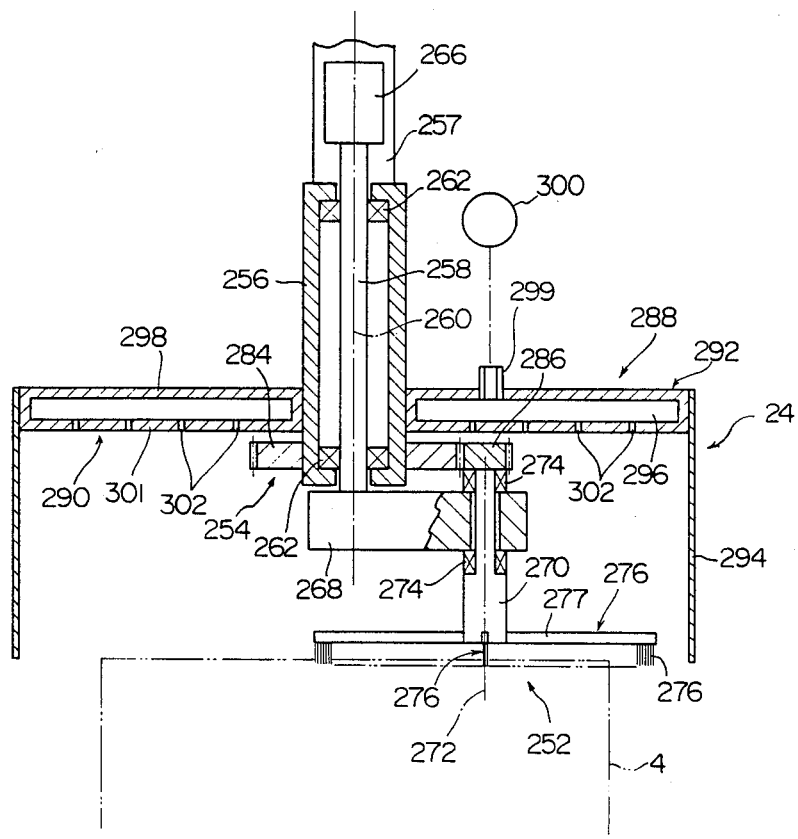
FIG. 11 is a sectional view showing a washing device in the cutter of FIG. 1.
Figure 12:
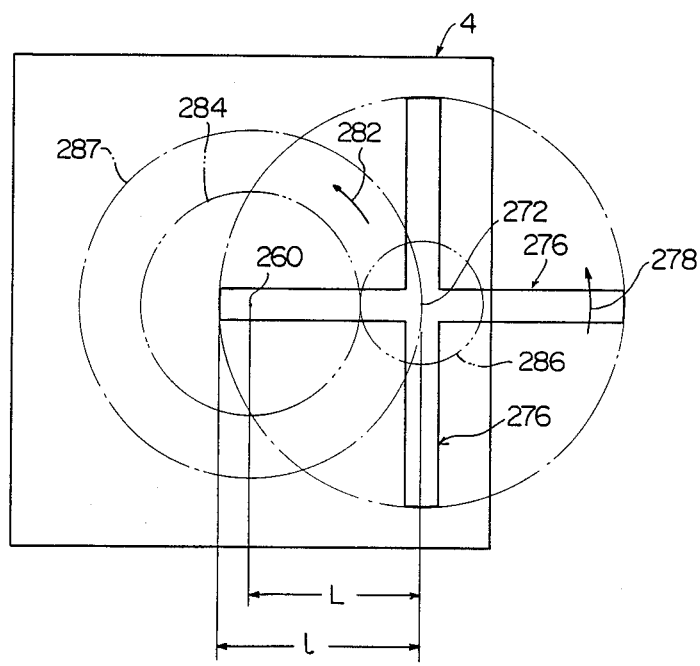
FIG. 12 is a simplified top plan view for illustrating the arrangement and motion of a brush member in the washing device of FIG. 11.

Now, the washing device 24 provided in relation to the chuck washing zone 16 will be described. With reference to FIGS. 11 and 12, the illustrated washing device 24 includes a cylindrical supporting member 256 which is fixed to a stationary supporting frame 257 disposed above the supporting base stand 2 (FIG. 1) in the chuck washing zone 16. A rotating main shaft 258 extending substantially vertically is mounted rotatably on the supporting member 256 via a bearing 262. The upper end portion of the rotating main shaft 258 projects upwardly through the upper end wall of the supporting member 256, and the upper end of the rotating main shaft 258 is drivingly connected to a driving source 266, which may be an electric motor, mounted on the supporting frame 257. The lower end portion of the rotating main shaft 256 extends downwardly through the front end wall of the supporting member 256, and a supporting member 268 is fixed to the lower end of the rotating main shaft 258. The supporting member 268 extends radially outwardly, and a substantially vertically extending rotary supporting shaft 270 is rotatably mounted on its outside end portion via a bearing 274. Washing means 252 is mounted on the lower end of the rotary supporting shaft 270. In the illustrated embodiment, the washing means 252 is comprised of a pair of brush members 276 extending substantially horizontally and being substantially perpendicular to each other. Each of the brush members 276 consists of a base plate 277 whose intermediate portion in the horizontal direction is fixed to the lower end of the rotary supporting shaft 270 and a number of bristles 279 fastened into the under surface of the substrate 277. The bristles 270, which may be made from a synthetic resin, are adapted to make contact with the surface of the chuck means 4 to be washed. Conveniently, as can be understood from FIG. 12, the rotating main shaft 258 is at a substantially central position of the chuck means 4 located in the chuck washing zone 16; the rotary supporting shaft 270 is positioned nearly midway between the center and the peripheral edge of the chuck means; and the length l from the center line 272 to each end of the brush member 276 is set at a value slightly larger than the distance L between the center line 260 of the rotating main shaft 258 and the center line 272 of the rotaty supporting shaft 270.

The washing device 24 further includes a planetary motion mechanism 254 for causing the rotary supporting shaft 270 to rotate and revolve according to the rotation of the rotating main shaft 258. The planetary motion mechanisms 254 is comprised of a stationary sun gear 284 fixed to the lower end portion of the supporting member 256 and an epicyclic gear 286 fixed to the upper end of the rotary supporting shaft 270 and engaging the stationary sun gear 284. When the rotating main shaft 258 is rotated in the direction of an arrow 282 (FIG. 12), the rotary supporting shaft 270 and the brush member 276 fixed to it revolve in the direction of arrow 282 (FIG. 12) about the center line 260 of the rotating main shaft 258 as a center (hence, the center line 272 of the rotary supporting shaft 270 draws a circular locus shown by a one-dot chain line 287 in FIG. 12). During this revolution, the rotary supporting shaft 270 and the brush member 276 fixed to it are rotated in the direction shown by an arrow 278 (FIG. 12) about the center line 272 of the rotary supporting shaft 270 as a center by the action of the planetary motion mechanism 254. If desired, a sun friction pulley and an epicyclic friction pulley may be used instead of the sun gear 284 and the epicyclic gear 286.

Further, with reference to FIG. 11, the washing device 24 also includes a cover 288 and washing liquid supply means 290. The cover 288 has a base plate 292 which may be circular (or polygonal, for example square, correspondingly to the shape of the chuck means 4), and a cylindrical (or polygonal) side wall 294 extending from the peripheral edge of the base plate 292. The base plate 292 of the cover 288 is fixed to the lower end portion of the supporting member 256, and the side wall 294 surrounds the brush member 276. An annular space is formed within the base plate 2, and constitutes a washing liquid manifold 296 in the washing liquid supply means 290. The washing liquid manifold 296 is kept in communication with the washing liquid supply source 300 via a flow-in port 299 formed in the upper wall 298 of the base plate 292. A number of jet holes 302 are formed in the lower wall 301 of the base plate 292.

In the washing device 24 described above, a washing liquid such as water is supplied to the manifold 296 from the washing liquid supply source 300 and jetted out toward the surface of the chuck means from the jet holes 302. Furthermore, the driving source 266 is energized to rotate the rotating main shaft 258 in the direction of arrow 282 (FIG. 12) and cause the brush member 276 to revolve and rotate as described above. Consequently, the brush member 276 acts on the entire surface of the chuck means 4 and washes it as is required.

FIG. 13 shows a second embodiment of the cutter constructed in accordance with this invention. In the second embodiment, five material holding chuck means 404 are disposed on the supporting base stand 402 at angular intervals of 72 degrees. On the supporting base stand 402 are defined a material carry-in zone 410, a first cutting zone 412A, a second cutting zone 412B, a material carry-out zone 414 and a chuck washing zone 416 spaced from each other by an angle of 72 degrees in this sequence as viewed in the rotating direction shown by an arrow 408. The supporting base stand 402 is rotated intermittently by an angle of 72 degrees in the direction of arrow 408 by an intermittently moving means 406, whereby the chuck means 404 are sequentially positioned in the material carry-in zone 410, the first cutting zone 412A, the second cutting zone 412B, the material carry-out zone 414 and the chuck washing zone 416.

Figure 14:
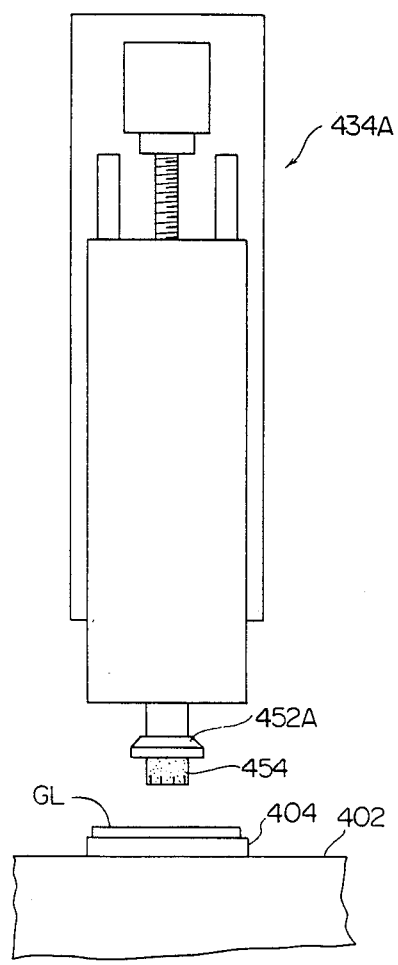
FIG. 14 is a front view showing a first cutting blade in the cutter of FIG. 13.

A first cutting blade device shown generally at 434A is provided in relation to the first cutting zone 412A, and a second cutting blade device shown generally at 434B is provided in relation to the second cutting zone 412B. The first cutting blade device 434A shown in FIG. 14 is substantially the same as the cutting blade device 20 in the first embodiment described hereinabove except that only a first blade 454 which is cylindrical with a relatively small diameter (the first blade 454 corresponds to the inside blade 138 in the cutting blade device 20) is fixedly secured to the under surface of the blade supporting member 452A. Furthermore, the second blade cutting blade device 434B shown in FIG. 15 is substantially the same as the cutting blade device 20 in the first embodiment except that a relatively large-diameter cylindrical second blade 456 (which corresponds to the outside blade 140 in the cutting blade device 20) is fixedly secured to the under surface of the blade supporting member 452B.

Figure 15:
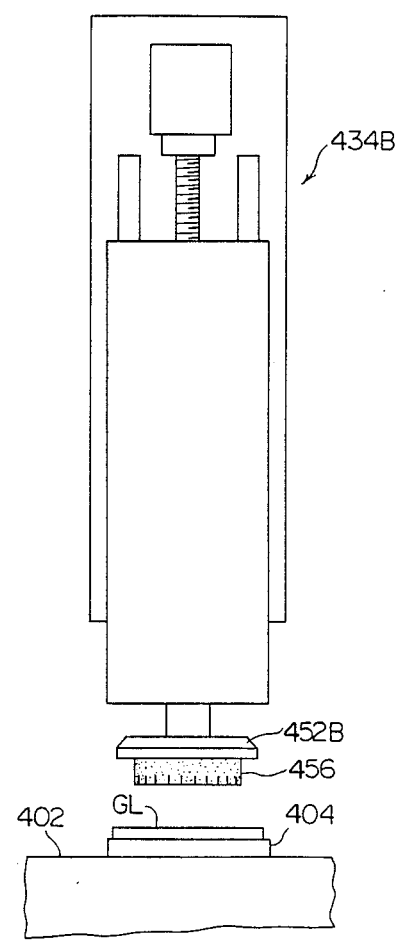
FIG. 15 is a front view showing a second cutting blade device in the cutter of FIG. 13.

With reference to FIGS. 14 and 15 in conjunction with FIG. 13, in the first cutting zone 412A, the plate-like material GL (or GS) suction-adhered to the chuck means 404 is cut along a circular inside cutting line by the first blade 454 of the first cutting blade device 434A. In the second cutting zone 412B, the plate-like material GL (or GS) suction-adhered to the chuck means 404 is cut along a circular outside cutting line by the second blade 456 of the second cutting blade device 434B.

Figure 17:
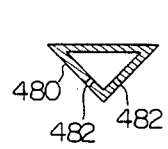
FIG. 17 is a sectional view of the surface gas spray means of FIG. 16.
Figure 16:
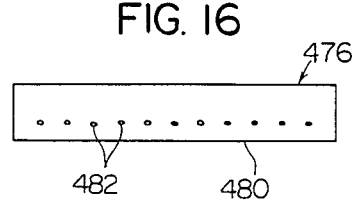
FIG. 16 is a side view showing surface gas spray means.
Figure 19:
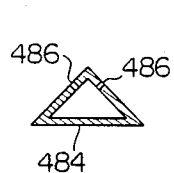
FIG. 19 is a sectional view of the back surface gas spray means of FIG. 18.
Figure 18:
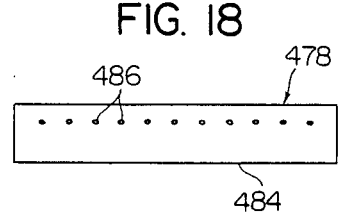
FIG. 18 is a side view showing back surface gas spray means in the cutter of FIG. 13.

With reference to FIG. 13, in the second embodiment, surface gas spray means 476 and back surface gas spray means 478 are further provided. The surface gas spray means 476 has an elongate spray nozzle 480 disposed above the supporting base stand 402 between the second cutting zone 412B and the material carry-out zone 414. With reference to FIGS. 16 and 17, the spray nozzle 480 has a hollow inverted-triangular sectional shape and a number of holes 482 are formed in its both inclined side walls. A gas such as hot air is selectively supplied to the spray nozzle 480, and ejected from the holes 482 and sprayed onto the surface of the plate-like material GL (or GS) on the chuck means 404 advancing below the spray nozzle 480 as the supporting base stand 402 rotates. Consequently, the cut chips and the cooling liquid adhering at the time of cutting are removed from the surface of the plate-like material GL (or GS) and the surface of the plate-like material GL (or GS) is washed and dried. The back surface gas spray means 478 has an elongate spray nozzle 484 disposed below the locus drawn by the suction-adhering head 502 in the material carry-out means 422 during its movement from a suction-adhering position shown by a solid line in FIG. 13 to the discarding position shown by a two-dot chain line 502A in FIG. 13. With reference to FIGS. 18 and 19, the spray nozzle 484 has a hollow triangular sectional shape, and a number of holes 486 are formed in its both inclined side walls. A gas such as hot air is selectively supplied to the spray nozzle 484, and ejected from the holes 486 and sprayed onto the back surface of the plate-like material GL (or GS) carried from the chuck means 404 while being suction-adhered to the suction-adhering head 502. As a result, the cut chips and the cooling liquid adhering during the cutting operation are removed from the back surface of the plate-like material GL (or GS), and the back surface of the plate-like material GL (or GS) is washed and dried.

The structure, operation and advantage of the second embodiment are substantially the same as those of the first embodiment, and a description thereof will be omitted there.

While the preferred embodiments of the cutter constructed in accordance with this invention have been described in detail with reference to the accompanying drawings, it should be understood that various changes or modifications are possible without departing from the scope of the invention described and claimed herein.

For example, in the illustrated embodiments, the same number of chuck means as the number of working zones defined on the supporting base stand (4 in the first embodiment and 5 in the second embodiment) are disposed on the supporting base stand. If desired, the chuck means may be disposed on the supporting base plate in numbers greater than the number of working zones (in this case, the chuck means is also positioned in one or more waiting positions among the working zones).

In the illustrated embodiments, the material carry-out zone, the chuck washing zone and the material carry-in zone are defined independently from each other. If desired, it is possible to provide a single zone composed of these working zones, and to carry the cut plate-like material from the chuck means, wash the chuck means and then carry the next plate-like material to be cut onto the chuck means while the chuck means is positioned in this single zone.

In the illustrated embodiments, the chuck means is sequentially positioned in the plurality of working zones by intermittently rotating the supporting base stand. If desired, it is possible to position the chuck means sequentially at the plurality of working zones by intermittently reciprocating a supporting base stand of a suitable type linearly or pivotally.

What is claimed is:

1. A cutter for cutting plate-like material along concentric circular inside and outside cutting lines, said cutter comprising:
   a movably mounted supporting base stand,
   at least two material-holding chuck means disposed on the supporting base stand, each chuck means including a chuck palet having a surface for holding material to be cut thereon, the chuck plate surface having two concentric annular grooves therein,
   intermittently moving means for intermittently moving the support base stand, and sequentially positioning each chuck means in a cutting zone,
   material carry-in means for carrying material to be cut to a chuck means located at a position in advance of the cutting zone,
   a cutting blade device for cutting material held on a chuck means moved into the cutting zone, said blade device comprising rotatably-mounted, concentric inside and outside blades each of the blades having front end portions formed to be received within the concentric, annular grooves of the chuck plate surface, blade rotating means for rotating the inside and outside blades, and blade moving means for moving the inside and outside blades toward and away from the supporting base stand, and
   material carry-out means for carrying cut material from a chuck means which has passed through the cutting zone.

2. The cutter of claim 1 wherein the cutting blade device includes a single, rotatably-mounted blade supporting member; both of the inside blade and the outside blade are fixedly secured to the blade supporting member; and the blade rotating means rotates the blade supporting member and the blade moving means moves the blade supporting member.

3. The cutter of claim 1 wherein the cutting blade device includes a rotatably mounted inside blade supporting member and an outside blade supporting member mounted rotatably independently from the inside blade supporting member; the inside blade is fixedly secured to the inside blade supporting member and the outside blade is fixedly secured to the outside blade supporting member; and the blade rotating means includes a first rotating means for rotating the inside blade supporting member and a second rotating means for rotating the outside blade supporting member.

4. The cutter of claim 3 wherein the rotating direction of the inside blade supporting member is opposite to that of the outside blade supporting member.

5. The cutter of claim 3 wherein the cutting blade device includes a movable supporting member mounted rotatably toward and away from the supporting base stand; both of the inside blade supporting member and the outside blade supporting member are rotatably mounted on the movable supporting member; and the blade moving means moves the movable supporting member.

6. The cutter of claim 5 wherein the cutting blade device includes an auxiliary supporting member mounted on the movable supporting member for free movement toward and away from the supporting base stand and auxiliary moving means for moving the auxiliary supporting member with respect to the movable supporting member; and one of the inside blade supporting member and the outside blade supporting member is mounted on the movable supporting member without the intermediary of the auxiliary supporting member but the other of said blade supporting members is mounted on the movable supporting member via the auxiliary supporting member.

7. The cutter of claim 1 wherein an outside edge region of the chuck plate and at least two nearly annular regions thereof where the annular grooves are formed are gas-impervious and the remainder of the chuck plate is gas-pervious; and the back surface of the chuck plate is adapted to be selectively kept in communication with a vacuum source.

8. The cutter of claim 7 wherein each of the material holding chuck means includes a holding plate to be mounted on the supporting base stand, and the chuck plate is mounted on the holding plate.

9. The cutter of claim 8 wherein the holding plate includes a depressed portion formed on its surface and a communication passage extending from the depressed portion to the back surface of the holding plate; and the back surface of the chuck plate is adapted to be selectively kept in communication with the vacuum source through the depressed portion and the communication passage.

10. The cutter of claim 9 wherein the depressed portion formed on the surface of the holding plate has an inside depressed portion positioned in its central part and an outside depressed portion isolated from, and surrounding, the inside depressed portion; and the communication passage has a first communication line extending from the inside depressed portion and a second communication line extending from the outside depressed portion, and an opening-closing control member disposed in the second communication line.

11. A cutter for cutting plate-like material along concentric circular inside and outside cutting lines, said cutter comprising:
a movably mounted supporting base stand,
at least three material-holding chuck means disposed on the support base stand,
intermittently moving means for intermittently moving the supporting base stand and sequentially positioning each chuck means in one of a first and a second cutting zone defined with a predetermined distance therebetween in the moving direction of the supporting base stand and then in the other of the first and second cutting zones,
material carry-in means for carrying material to be cut to a chuck means located at a position in advance of the cutting zones,
a first cutting blade device for cutting material held on a chuck means moved into the first cutting zone, said first cutting blade comprising a first rotatably-mounted blade, a first blade rotating means for rotating the first blade and a first blade moving means for moving the first blade toward and away from the supporting base stand,
a second cutting blade device for cutting material held on a chuck means moved into the second cutting zone, said second cutting blade comprising a second rotatably-mounted blade, a second blade rotating means for rotating the second blade means and a second blade moving means for moving the second blade toward and away from the supporting base stand, one of the first and second cutting blade devices being adapted to cut the material along an inside cutting line and the other of the first and second cutting blade devices being adapted to cut the material along an outside cutting line, and
material carry-out means for carrying cut material from a chuck means which has passed through the cutting zones, the material carry-out means including a suction-adhering head to be selectively held at a suction-adhering position wherein the head faces one of the material holding chuck means, a discarding position wherein the head faces a discarding receptacle, and an accommodating position wherein the head faces an accommodating means,
the suction-adhering head having a first suction-adhering member for suction-adhering a central unwanted portion of the plate-like material inwardly of the inside cutting line, a second suction-adhering member for suction-adhering a product portion of the plate-like material between the inside cutting line and the outside cutting line, and a third suction-adhering member for suction-adhering an outside unwanted portion of the plate-like material outwardly of the outside cutting line,
at the suction-adhering position, the first, second and third suction-adhering members being kept in communication with a vacuum source whereby the entire plate-like material is suction-adhered to the suction-adhering head by the first, second and third suction-adhering members,
at the discarding position, the second suction-adhering member being kept in communication with the vacuum source but the first and third suction-adhering members being disconnected from the vacuum source whereby the central unwanted portion and the outside unwanted portion of the plate-like material are discarded into the discharging receptacle from the suction-adhering head, and
at the accommodating position, the second-suction-adhering member also being cut off from the vacuum source whereby the product portion of the plate-like material is fed into the accommodating means from the suction-adhering head.

12. The cutter of claim 11 wherein at the discarding position, the first and third suction-adhering members are allowed to communicate with a compression air supply source only for a predetermined period of time, and at the accommodating position, the second suction-adhering member is allowed to communicate with the compressed air supply source only for a predetermined period of time.

13. The cutter of claim 11 wherein the third suction-adhering member is adjustable in its radial direction from the center of the suction-adhering head.

14. A cutter for cutting plate-like material along concentric circular inside and outside cutting lines, said cutter comprising:

a movably mounted supporting base stand, at least two material-holding chuck means disposed on the supporting base stand, intermittently moving means for intermittently moving the supporting base stand, and sequentially positioning each chuck means in a cutting zone, material carry-in means for carrying material to be cut to a chuck means located at a position in advance of the cutting zone, a cutting blade device for cutting material held on a chuck means moved into the cutting zone, said blade device comprising rotatably-mounted, concentric inside and outside blades, blade rotating means for rotating the inside and outside blades, and blade moving means for moving the inside and outside blades toward and away from the supporting base stand, and material carry-out means for carrying out material from a chuck means which has passed through the cutting zone, the material carry-out means including a suction-adhering head to be selectively held at a suction-adhering position wherein the head faces one of the material holding chuck means, a discarding position wherein the head faces a discarding receptacle, and an accommodating position wherein the head faces an accommodating means, the suction-adhering head having a first suction-adhering member for suction-adhering a central unwanted portion of the plate-like material inwardly of the inside cutting line, a second suction-adhering member of suction-adhering a product portion of the plate-like material between the inside cutting line and the outside cutting line, and a third suction-adhering member for suction-adhering an outside unwanted portion of the plate-like material outwardly of the outside cutting line, at the suction-adhering position, the first, second and third suction-adhering members being kept in communication with a vacuum source whereby the entire plate-like material is suction-adhered to the suction-adhering head by the first, second and third suction-adhering members, at the discarding position, the second suction-adhering member being kept in communication with the vacuum source but the first and third suction-adhering members being disconnected from the vacuum source whereby the central unwanted portion and the outside unwanted portion of the plate-like material are discarded into the discarding receptacle from the suction-adhering head, and at the accommodating position, the second suction-adhering member also being disconnected from the vacuum source whereby the product portion of the plate-like material is fed into the accommodating means from the suction-adhering head.

15. The cutter of claim 14 wherein at the discarding position, the first and third suction-adhering members are allowed to communicate with a compression air supply source only for a predetermined period of time, and at the accommodating position, the second suction-adhering member is allowed to communicate with the compressed air supply source only for a predetermined period of time.

16. The cutter of claim 14 wherein the third suction-adhering member is adjustable in its radial direction from the center of the suction-adhering head.

17. A cutter for cutting plate-like material along concentric circular inside and outside cutting lines, said cutter comprising:

a rotatably mounted supporting base stand, at least four material-holding chuck means mounted at circumferentially equidistant positions on the supporting base stand so that when a first of the chuck means is positioned in a material carry-in zone, a second of the chuck means is positioned in a material cutting zone, a third of the chuck means is positioned in a material carry-out zone, and a fourth of the chuck means is positioned in a chuck washing zone, the zones being defined sequentially as viewed in the rotating direction of the supporting base stand, intermittently moving means for intermittently rotating the supporting base stand in a predetermined direction, and sequentially positioning each chuck means in a cutting zone, material carrying-in means for carrying material to be cut to the first chuck means positioned in the material carry-in zone, outside of the cutting zone, a cutting blade device for cutting material held on the second chuck means moved into the cutting zone, said blade device comprising rotatably-mounted, concentric inside and outside blades, blade rotating means for rotating the inside and outside blades, and blade moving means for moving the inside and outside blades toward and away from the supporting base stand, material carry-out means for carrying cut material from the third chuck means positioned in the material carry-out zone, outside of the cutting zone, and a washing device for washing the fourth chuck means positioned in the washing zone, the washing device comprising a rotating main shaft, a driving source for rotating the rotating main shaft, a supporting member fixed to the rotating main shaft, a rotary supporting shaft rotatably mounted on the supporting member and extending substantially parallel to, and spaced from, the rotating main shaft, a planetary motion mechanism for rotating the rotary supporting shaft according to the revolving of the rotary supporting shaft caused by the rotation of the rotating main shaft, and washing means fixed to the rotary supporting shaft.

18. The cutter of claim 17 wherein the washing means is comprised of at least one brush member extending in a direction substantially perpendicular to the rotary supporting shaft.

19. The cutter of claim 18 wherein the length from the center line of the rotary supporting shaft to the free end of the brush member is larger than the length from the center line of the rotating main shaft to the center line of the rotary supporting shaft.

20. The cutter of claim 17 wherein the washing device is further provided with washing liquid supply means.

21. The cutter of claim 20 wherein the washing device is provided with a cover having a circular or polygonal base plate through the center of which the rotating main shaft extends and a cylindrical side wall extending from the peripheral edge of the base plate; the brush member is disposed in the cylindrical side wall of the cover; and the washing liquid supply means comprises a washing liquid manifold formed in the base plate of the cover, a plurality of jet holes opened in the inside surface of the base plate, and a washing liquid supply source communicating with the washing liquid manifold.

22. The cutter of claim 17 wherein the planetary motion mechanism is comprised of a stationary sun gear and an epicyclic gear mechanism fixed to the rotary supporting shaft and an epicyclic gear engaging the stationary sun gear.

23. A cutter for cutting plate-like material along concentric circular inside and outside cutting lines, said cutter comprising:
a movably mounted supporting base stand,
at least three material-holding chuck means disposed on the supporting base stand, each chuck means including a chuck plate having a surface for holding material to be cut thereon, the chuck plate surface having two concentric annular grooves therein,
intermittently moving means for intermittently moving the supporting base stand and sequentially positioning each chuck means in one of a first and a second cutting zone defined with a predetermined distance therebetween in the moving direction of the supporting base stand and then in the other of the first and second cutting zones,
material carry-in means for carrying material to be cut to a chuck means located at a position in advance of the cutting zones,
a first cutting blade device for cutting material held on a chuck means moved into the first cutting zone, said first cutting blade comprising a first rotatably-mounted blade having a front end portion formed to be received within one of the grooves of the chuck plate surface, a first blade rotating means for rotating the first blade and a first blade moving means for moving the first blade toward and away from the supporting base stand,
a second cutting blade device for cutting material held on a chuck means moved into the second cutting zone, said second cutting blade comprising a second rotatably-mounted blade having a front end portion formed to be received within the other of the grooves of the chuck plate surface, a second blade rotating means for rotating the second blade means and a second blade moving means for moving the second blade toward and away from the supporting base stand, and
material carry-out means for carrying cut material from a chuck means which has passed through the cutting zones;
one of the first and second cutting blade devices being adapted to cut the material along an inside cutting line and the other of the first and second cutting blade devices being adapted to cut the material along an outside cutting line.

24. The cutter of claim 23 wherein an outside edge region of the chuck plate and at least two nearly annular regions thereof where the annular grooves are formed are gas-impervious and the remainder of the chuck plate is gas-pervious, and the back surface of the chuck plate is adapted to communicate selectively with a vacuum source.

25. The cutting of claim 24 wherein each of the material holding chuck means includes a holding plate to be mounted on the supporting base stand, and the chuck plate is to be mounted on the holding plate.

26. The cutter of claim 25 wherein the holding plate includes a depressed portion formed on its surface and a communication passage extending from the depressed portion to the back surface of the holding plate, and the back surface of the chuck plate is adapted to communicate selectively with the vacuum source via the depressed portion and the communication passage.

27. The cutter of claim 26 wherein the depressed portion formed on the surface of the holding plate has a centrally positioned inside depressed portion and an outside depressed portion isolated from, and surrounding, the outside depressed portion; and the communication passage has a first communication line extending from the inside depressed portion and a second communication line extending from the outside depressed portion, and an opening-closing control member is disposed in the second communication line.

28. A cutter for cutting plate-like material along concentric circular inside and outside cutting lines, said cutter comprising:
a rotatably mounted supporting base stand,
at least five material-holding chuck means mounted at circumferentially equidistant positions on the supporting base stand so that when a first of the chuck means is positioned in a first cutting zone, a second of the chuck means is positioned in a second cutting zone, a third of the chuck means is positioned in a material carry-out zone, a fourth of the chuck means is positioned in a chuck washing zone, and a fifth of the chuck means is positioned in a material carry-in zone, the zones being defined sequentially as viewed in the rotating direction of the supporting base stand,
intermittently moving means for intermittently rotating the supporting base stand in a predetermined direction and sequentially positioning each chuck means in one of a first and a second cutting zone defined with a predetermined distance therebetween in the moving direction of the supporting base stand and then in the other of the first and second cutting zones,
material carry-in means for carrying material to be cut to the fifth of the chuck means which is positioned in the material carry-in zone, outside of the cutting zones,
a first cutting blade device for cutting material held on the first chuck means moved into the first cutting zone, said first cutting blade comprising a first rotatably-mounted blade, a first blade rotating means for rotating the first blade and a first blade moving means for moving the first blade toward and away from the supporting base stand,
a second cutting blade device for cutting material held on the second chuck means moved into the second cutting zone, said second cutting blade comprising a second rotatably-mounted blade, a second blade rotating means for rotating the second blade means and a second blade moving means for moving the second blade toward and away from the supporting base stand, one of the first and second cutting blade devices being adapted to cut the material along an inside cutting line and the other of the first and second cutting blade devices being adapted to cut the material along an outside cutting line, material carry-out means for carrying cut material from the third chuck means which is positioned in the material carry-out zone, outside of the cutting zones, a washing device for washing the fourth chuck means which is positioned in the washing zone, the washing device comprising a rotating main shaft, a driving source for rotating the rotating main shaft, a supporting member fixed to the rotating main shaft, a rotary supporting shaft rotatably mounted on the supporting member and extending substantially parallel to, and spaced from, the rotating main shaft, a planetary motion mechanism for rotating the rotary supporting shaft according to the revolving of the rotary supporting shaft caused by the rotation of the rotating main shaft, and washing means fixed to the rotary supporting shaft.

29. The cutter of claim 28 wherein the washing means is comprised of at least one brush member extending in a direction substantially perpendicular to the rotary supporting shaft.

30. The cutter of claim 27 wherein the length from the center line of the rotary supporting shaft to the free end of the brush member is larger than the length from the center line of the rotating main shaft to the center line of the rotary supporting shaft.

31. The cutter of claim 28 wherein the washing device is further provided with washing liquid supply means.

32. The cutter of claim 31 wherein the washing device is provided with a cover having a circular or polygonal base plate through the center of which the rotating main shaft extends and a cylindrical side wall extending from the peripheral edge of the base plate; the brush member is disposed in the cylindrical side wall of the cover; and the washing liquid supply means comprises a washing liquid manifold formed in the base plate of the cover, a plurality of jet holes opened in the inside surface of the base plate, and a washing liquid supply source communicating with the washing liquid manifold.

33. The cutter of claim 28 wherein the planetary motion mechanism is comprised of a stationary sun gear and an epicyclic gear mechainism fixed to the rotary supporting shaft and an epicyclic gear engaging the stationary sun gear.

* * * * *